(12) United States Patent
Thalhammer et al.

(10) Patent No.: US 8,430,148 B2
(45) Date of Patent: Apr. 30, 2013

(54) ROLLER BLIND DEVICE

(75) Inventors: Marco Thalhammer, Munich (DE);
Horst-Martin Schulz, Weil (DE);
Bernhard Harnischfeger, Dachau (DE);
Andreas Rockelmann, München (DE);
Manfred Steinle, Schondorf (DE)

(73) Assignee: Webasto SE, Stockdorf (DE)

( * ) Notice: Subject to any disclaimer, the term of this patent is extended or adjusted under 35 U.S.C. 154(b) by 1 day.

(21) Appl. No.: 12/675,386

(22) PCT Filed: Jul. 2, 2008

(86) PCT No.: PCT/DE2008/001082
§ 371 (c)(1),
(2), (4) Date: Sep. 28, 2010

(87) PCT Pub. No.: WO2009/033439
PCT Pub. Date: Mar. 19, 2009

(65) Prior Publication Data
US 2011/0056632 A1 Mar. 10, 2011

(30) Foreign Application Priority Data

Sep. 11, 2007 (EP) .................................. 07017793

(51) Int. Cl.
*E06B 9/14* (2006.01)
(52) U.S. Cl.
USPC ........................................ 160/23.1; 160/314
(58) Field of Classification Search ............. 160/370.22, 160/23.1, 37, 24, 238, 264, 313, 314, 317; 296/214, 141, 97.8
See application file for complete search history.

(56) References Cited

U.S. PATENT DOCUMENTS

| 758,016 | A | * | 4/1904 | Mudd | 160/22 |
| 843,837 | A | * | 2/1907 | McMaster | 40/517 |
| 1,570,016 | A | * | 1/1926 | Truemper | 160/23.1 |
| 2,204,739 | A | * | 6/1940 | Wells | 160/23.1 |
| 2,561,188 | A | * | 7/1951 | Ferguson | 160/23.1 |
| 2,689,002 | A | * | 9/1954 | De Rose | 160/23.1 |
| 2,773,547 | A | * | 12/1956 | Voss | 160/301 |
| 4,131,269 | A | * | 12/1978 | Brattrud | 296/95.1 |
| 4,807,684 | A | * | 2/1989 | Melton | 160/23.1 |
| 4,809,760 | A | * | 3/1989 | Lew | 160/120 |
| 4,825,921 | A | * | 5/1989 | Rigter | 160/23.1 |
| 5,067,546 | A | * | 11/1991 | Jeuffray et al. | 160/23.1 |
| 5,133,585 | A | * | 7/1992 | Hassan | 296/97.5 |

(Continued)

FOREIGN PATENT DOCUMENTS

DE 20 2005 006 415 U1 6/2005
DE 10 2007 021 049 A1 11/2008

(Continued)

*Primary Examiner* — Katherine Mitchell
*Assistant Examiner* — Johnnie A Shablack
(74) *Attorney, Agent, or Firm* — Fitch Even Tabin & Flannery LLP

(57) ABSTRACT

A roller blind device, in particular for a sliding roof system, having a roller blind web that, at least one end, can be wound by a winding device to form a roller blind winding, with the winding device comprising self-winding spiral springs that are connected to the roller blind web, with a winding shaping device being provided for shaping and/or guiding the roller blind winding, with the winding shaping device interacting with the roller blind web only in web regions of the roller blind web between the spiral springs.

15 Claims, 4 Drawing Sheets

U.S. PATENT DOCUMENTS

| | | | | |
|---|---|---|---|---|
| 5,271,634 | A * | 12/1993 | Walton | 280/33.992 |
| 5,365,990 | A * | 11/1994 | Ueda | 160/23.1 |
| 5,711,568 | A * | 1/1998 | Diem et al. | 296/37.16 |
| 5,775,765 | A * | 7/1998 | Kintz | 296/98 |
| 5,860,466 | A * | 1/1999 | Kao | 160/370.22 |
| 5,947,544 | A * | 9/1999 | Hubeshi | 296/97.4 |
| 6,047,762 | A * | 4/2000 | Anderson | 160/370.22 |
| 6,086,133 | A * | 7/2000 | Alonso | 296/97.8 |
| 6,250,321 | B1 * | 6/2001 | Ernst | 135/88.11 |
| 6,309,076 | B1 * | 10/2001 | McVicker | 359/601 |
| 6,547,307 | B2 * | 4/2003 | Schlecht et al. | 296/97.4 |
| 6,848,493 | B1 * | 2/2005 | Hansen et al. | 160/370.22 |
| 6,983,786 | B2 * | 1/2006 | Chen | 160/370.22 |
| 7,114,766 | B2 * | 10/2006 | Becher et al. | 296/214 |
| 7,612,938 | B2 * | 11/2009 | Liang et al. | 359/443 |
| 7,823,955 | B2 * | 11/2010 | Alacqua et al. | 296/97.4 |
| 7,984,746 | B2 * | 7/2011 | Gao et al. | 160/370.21 |
| 2005/0225122 | A1 | 10/2005 | Becher et al. | |
| 2007/0084572 | A1 * | 4/2007 | Davenport et al. | 160/370.22 |
| 2008/0061605 | A1 | 3/2008 | Jugl et al. | |

FOREIGN PATENT DOCUMENTS

| | | |
|---|---|---|
| DE | 10 2007 041 296 A1 | 3/2009 |
| EP | 1 127 722 A1 | 8/2001 |
| EP | 1 584 509 A2 | 10/2005 |
| EP | 1 900 560 A1 | 3/2008 |

\* cited by examiner

A - A

A - A

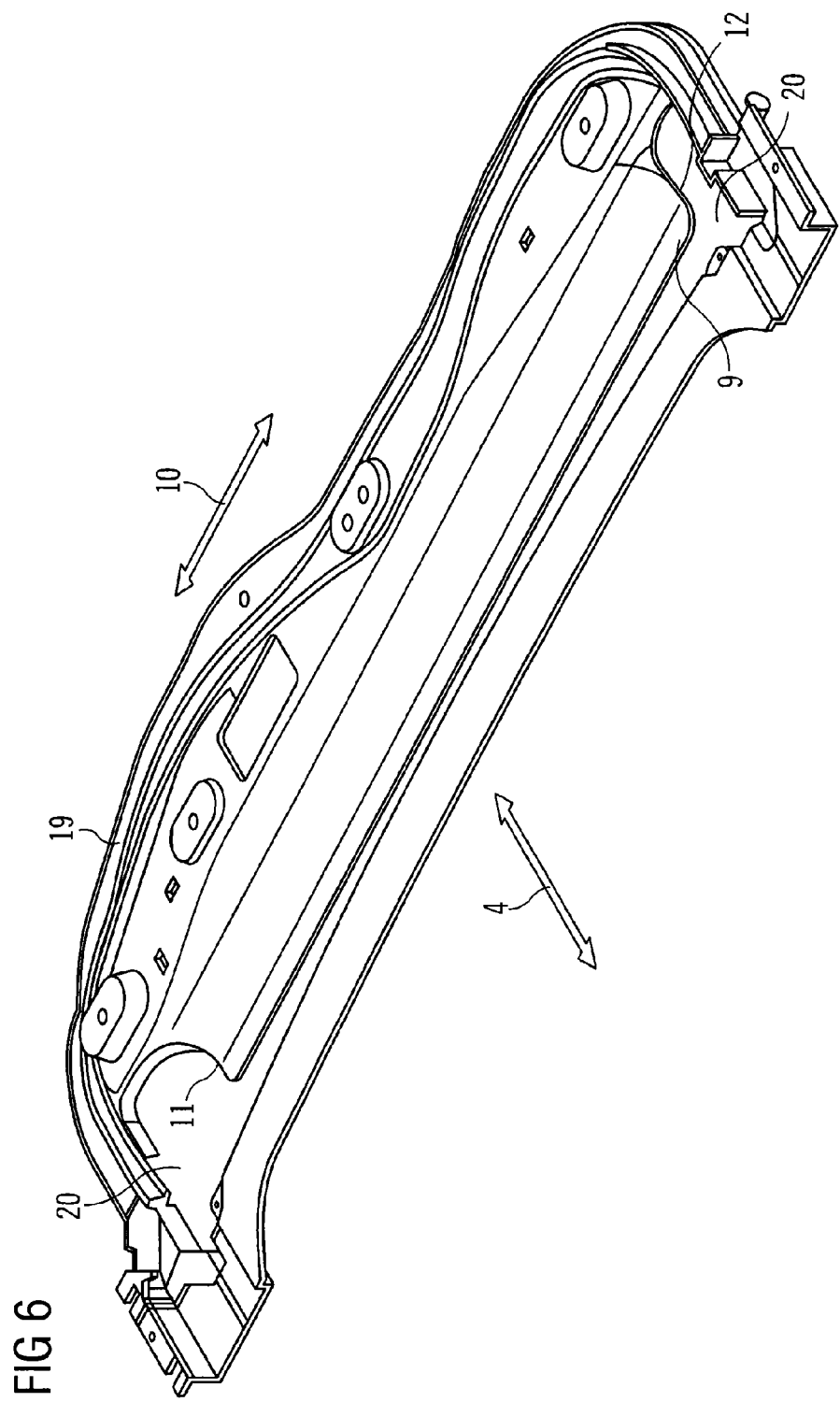

ROLLER BLIND DEVICE

BACKGROUND OF THE INVENTION

1. Field of the Invention

The invention relates to a roller blind device, in particular for a sliding roof system.

2. Related Technology

DE 20 2005 006 415 U1 discloses an assembly having a roller blind and two spiral springs which extend along longitudinal edges of the roller blind. The spiral springs are guided in guides. The roller blind device has a winding aid which interacts, behind the guides, with the spiral springs. The roller blind assembly can be formed without a winding core.

EP 1 584 509 A2 discloses a roller blind for a sliding roof system in which a roller blind web can be wound automatically about a winding core by means of spiral springs. A wall can be provided against which the roller blind winding runs.

In said roller blinds known from the prior art, it is disadvantageous that, firstly, the variability of the spatial configuration of the roller blind winding is unsatisfactory. Secondly, the geometric adaptability or diversity of structural adaptability of such roller blind devices to surrounding roof geometries is often inadequate. Furthermore, on account of the interaction of winding aids directly with the spiral spring during the retraction and extension of the roller blind, the latter can undesirably become jammed. This restricts the operating comfort of the roller blind.

SUMMARY OF THE INVENTION

The invention provides a roller blind device which is firstly of simple and cost-effective design and secondly enables a high degree of variability with regard to spatial shape and the contour of the roller blind winding and which can therefore be structurally adapted to an extremely wide variety of external spatial requirements in a simple manner. Furthermore, the visual appearance and the operating comfort should be improved. Furthermore, it should be ensured that, during the operation of the roller blind, no jamming of the roller blind web or other irregularities occur.

Accordingly, the invention provides a roller blind device, in particular for a sliding roof system, having a roller blind web which, at least one end, can be wound by a winding device to form a roller blind winding, with the winding device comprising self-winding spiral springs connected to the roller blind web, wherein a winding shaping device is provided for shaping and/or guiding the roller blind winding, with the winding shaping device interacting with the roller blind web only in web regions of the roller blind web between the spiral springs.

The invention makes use of the advantages of the self-winding spiral springs, since a winding device of said type for roller blinds makes it possible for the roller blind web to be wound without a winding core in a simple manner. Therefore, a core-free roller blind winding is formed in a region between two spiral springs which are responsible for winding the roller blind web in a winding direction, which roller blind winding has only roller blind web windings and, instead of the winding core of conventional roller blind devices, has a cavity. In this way, the roller blind winding can be deformed in terms of its spatial shape in a simple manner in the regions between the spiral springs, and can in particular assume a spatial shape which deviates from a cylindrical or approximately cylindrical shape. Furthermore, a longitudinal extent of the roller blind winding in space can be freely selected within wide limits since a winding-core-free roller blind winding composed only of the roller blind web can in a relatively simple manner be contoured, for example curved, or arranged or guided in some other way which deviates from a straight line. The invention utilizes this fact and provides, in regions between the self-winding spiral springs, a winding shaping device for shaping and guiding the roller blind winding.

Here, "shaping" of the roller blind winding is to be understood within the context of the invention to mean manipulation of the cross section of the roller blind winding. Within the context of the invention, "guidance" of the roller blind winding is to be understood to mean a contouring of the profile of the roller blind winding along its longitudinal direction, in particular deviating from a straight line. Suitable for this purpose are, for example, curvatures which are matched for example to a roof profile in the vehicle transverse direction of a vehicle. Below, therefore, the expression "shaping" refers to a cross-sectional spatial shape of the roller blind winding and the expression "guidance" refers to the profile of an imaginary longitudinal central axis of the roller blind winding along its longitudinal extent.

Although the device according to the invention may theoretically be formed with a winding core, for example a flexible, rod-like central core of small diameter, it is without doubt particularly advantageous for the roller blind device to be formed without a winding core. This provides maximum freedom with regard to the shaping and guidance of the roller blind winding.

The winding shaping device for shaping and guiding the roller blind winding has a winding space for holding, shaping and guiding the roller blind web.

In the simplest conceivable embodiment, the winding space has an approximately circular spatial shape in cross section.

It is nevertheless alternatively possible for the cross section of the winding space to have a substantially oval, flattened shape, with an imaginary major axis of the oval running in or parallel to the roller blind web plane. In this way, a particularly flat design of the roller blind winding is possible, as a result of which it is possible to achieve an installation space gain in the vehicle vertical direction in particular when the roller blind device according to the invention is used as a roller blind for a sliding roof system of a motor vehicle.

It is nevertheless also advantageous in certain applications for the major axis of the oval to be arranged substantially perpendicular to the web plane, as a result of which it is possible to realize a relatively short design in relation to the winding and retraction direction of the roller blind device.

Depending on the application, it may also be expedient for the major axis of the oval cross section of the winding space to be inclined at an angle α of between 0° and 90° with respect to the roller blind web plane.

It may also be expedient to force the roller blind web to assume different cross sectional shapes along its longitudinal extent. For example, it is advantageous for the cross section of the roller blind winding to change progressively from for example an oval, flattened spatial shape to a circular shape toward the edge of the roller blind web in order to keep stresses to the edge regions of the roller blind web, in which the spiral springs, which wind up in circular form, are arranged, as low as possible. In this way, it is possible to prevent undesired folds from forming in the roller blind web.

In a further particular embodiment, an imaginary central longitudinal axis of the winding space, in which the roller blind winding is arranged and the roller blind winding wound up and unwound around said imaginary line, has a spatial shape which deviates from a straight line, for example a curvature. In this way, it is possible in particular by means of the winding shaping device, in addition or alternatively to the shaping of the winding, to also provide guidance of the roller blind winding by virtue of the winding space or the winding shaping device which forms or borders the winding space to have a corresponding profile in space. For example, it is possible to provide matching to a roof curvature. In this way, an installation space gain is achieved in a vehicle vertical direction, in particular in interaction with a deformation, in particular flattening of the roller blind winding in the central region between the spiral springs.

To reduce the number of individual parts required, it is particularly advantageous for the winding shaping device to be integrated in or formed on a roof frame.

To keep force influences of the winding shaping device on the roller blind web in the edge region of the roller blind web as low as possible, and therefore prevent possible fold formations in the edge region, in particular in the transition region to the spiral springs, it is advantageous for the winding shaping device to be arranged with a minimum spacing a to the spiral springs in the roller blind web transverse direction.

The minimum spacing a is advantageously 5 mm to 40 mm, in particular 5 mm to 25 mm. At any rate, it is intended according to the invention to prevent contact interaction between the winding shaping device and the spiral springs at the edge of the roller blind web, or if appropriate spiral springs in regions within the roller blind web.

The winding shaping device is preferably of shell-shaped or channel-shaped design or borders a winding space virtually completely and leaves free only an inlet or outlet slot for the roller blind web.

According to a further embodiment, the winding shaping device is formed from a multiplicity of substantially clasp-like individual devices which extend in each case over only a small longitudinal extent of the roller blind winding. It is if appropriate also possible for gaps to be provided between the individual winding shaping device individual parts, in which gaps the roller blind winding runs freely, that is to say does not interact with a winding shaping device.

BRIEF DESCRIPTION OF THE DRAWINGS

The invention is explained in more detail below on the basis of the drawing by way of an example. In the drawing.

DETAILED DESCRIPTION

Figure 1:
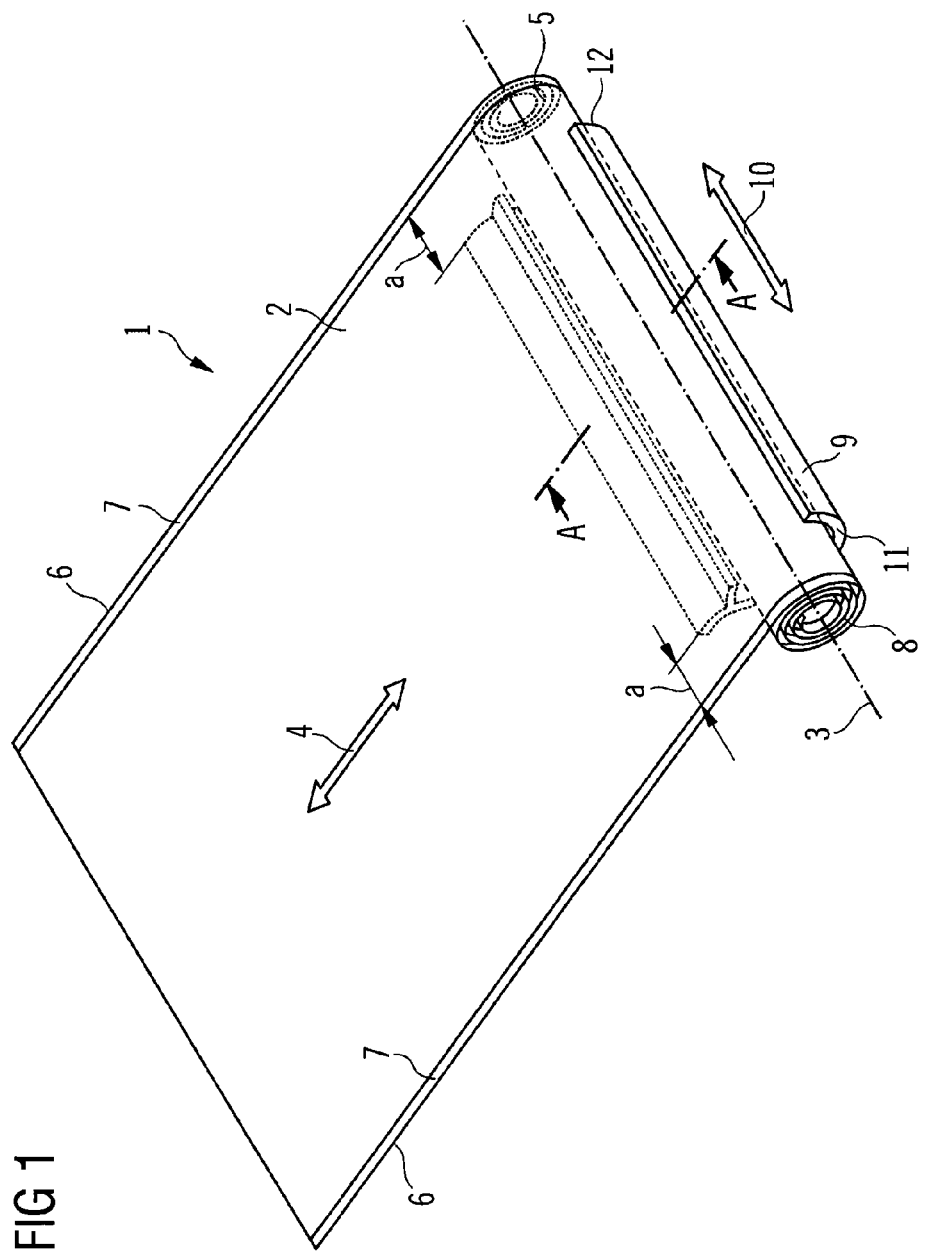
FIG. 1 schematically shows a first embodiment of a roller blind device according to the invention in a perspective illustration.

A roller blind device 1 according to the invention has a roller blind web 2 which can be wound and unwound at least at one end about a winding axis 3 in a winding direction 4. In this way, a roller blind winding 5 is formed around the winding axis 3. Self-winding spiral springs 7 are connected to the roller blind web 2 at longitudinal edges 6 of the roller blind web 2. The spiral springs 7 may if appropriate be guided in guide rails (not shown), with the spiral springs 7 automatically rolling up into a spiral 8 about the winding axis 3.

A winding shaping device 9 is arranged between the spiral springs 7, that is to say in the region of the roller blind web 2. In a first embodiment according to FIGS. 1 and 6, the winding shaping device 9 is of substantially channel-shaped design and extends in a transverse direction 10 of the roller blind device in a region between the spiral springs 7, without interacting with said spiral springs 7. For this purpose, a first free end region 11 and a second free end region 12 of the winding device 9 are arranged with a minimum spacing a to the spiral spring 7. The minimum spacing a is advantageously between 5 mm and 40 mm, in particular between 5 mm and 25 mm. The minimum spacing a may be of equal size or of different sizes at both sides of the roller blind web 2. The winding shaping device 9 borders a winding space 13 (cf. FIG. 2) in which the roller blind winding 5 is held in the partially or completely wound state of the roller blind web 2. The roller blind winding 5 has no winding core in the described exemplary embodiment. The winding axis 3 is therefore not to be understood as a geometrically clearly defined winding axis but rather as a substantially resultant winding axis which, on account of the softness and deformability of the roller blind winding 5 formed from the roller blind web 2, has an imaginary profile within the winding space 13.

Such an imaginary and desired profile of the winding axis 3 can be influenced by means of the spatial shape of the winding shaping device 9 along the transverse direction 10 of the roller blind winding 5. It is possible, for example, for a curvature of the winding shaping device 9 along the transverse direction 10 to lead to a curved arrangement or curved guidance of the roller blind winding 5, so as in particular to enable matching of the roller blind winding profile in the transverse direction 10 to a roof curvature of a vehicle. In the case in particular of particularly wide roller blind devices, that is to say in the case of roller blind devices with a particularly large extent in the transverse direction 10, it is possible by means of suitable shaping of the winding shaping device 9 to provide a contouring of the winding axis 3 of the roller blind winding 5. For example, it is possible for a substantially straight profile of the roller blind winding 5 to firstly be obtained in edge regions of the roller blind web 2. A curved section can be contoured between the straight regions of the roller blind winding 5. In this way, it is for example possible to obtain a substantially roof-shaped design of the roller blind device 1. It is therefore possible by means of the winding shaping device 9 to provide a contouring, that is to say guidance according to the invention, of the roller blind winding 5 and to manipulate the profile of the winding axis 3.

Figure 2:
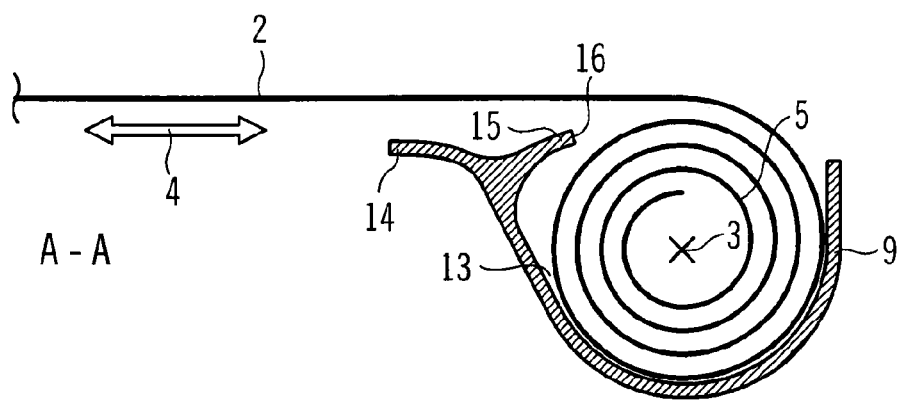
FIG. 2 schematically shows a sectional illustration along the line A-A from FIG. 1.

FIG. 2 shows a possible approximately circular cross-sectional spatial shape of the winding shaping device 9 along the section line A-A in FIG. 1. Said section is situated approximately in the center of the roller blind winding 5 in relation to its longitudinal extent in the transverse direction 10. The winding shaping device 9 borders the winding space 13, in which the roller blind winding 5 is arranged, in substantially the form of a channel. The winding shaping device 9 has a free edge 14 which points in the winding direction 4, in particular in the pulling-out direction of the roller blind web 2.

The free edge 14 is assigned a stop rib 15 whose free edge 16 points counter to the pulling-out direction 4. The stop rib 15 serves, as the roller blind web 2 is pulled out, that is to say as the roller blind web 2 is pulled off the roller blind winding 5, as a stop for the rest of the rolled winding and ensures that the roller blind web 2 is unwound without becoming jammed.

In a first embodiment of the invention, the winding space 13 of the winding shaping device 9 has an approximately circular spatial shape in cross section, such that an approximately circular roller blind winding 5 is formed as the roller blind web 2 is wound.

According to a further embodiment of the invention (FIG. 3), the cross-sectional spatial shape of the winding space 13 is of oval, flattened design, with a major axis HA of the oval being aligned approximately parallel to the plane of extent of the roller blind web 2. The minor axis NA is arranged approximately vertically with respect to the roller blind web 2. Such an embodiment makes it possible to generate a pronounced flattening of the roller blind winding 5 for example in the central region of the roller blind winding 5 between the spiral springs 7. In this way, it is possible to achieve considerable installation space gains in the vehicle vertical direction, for example, if the roller blind device is used as a sunshield device for sliding roof systems.

Figure 4:
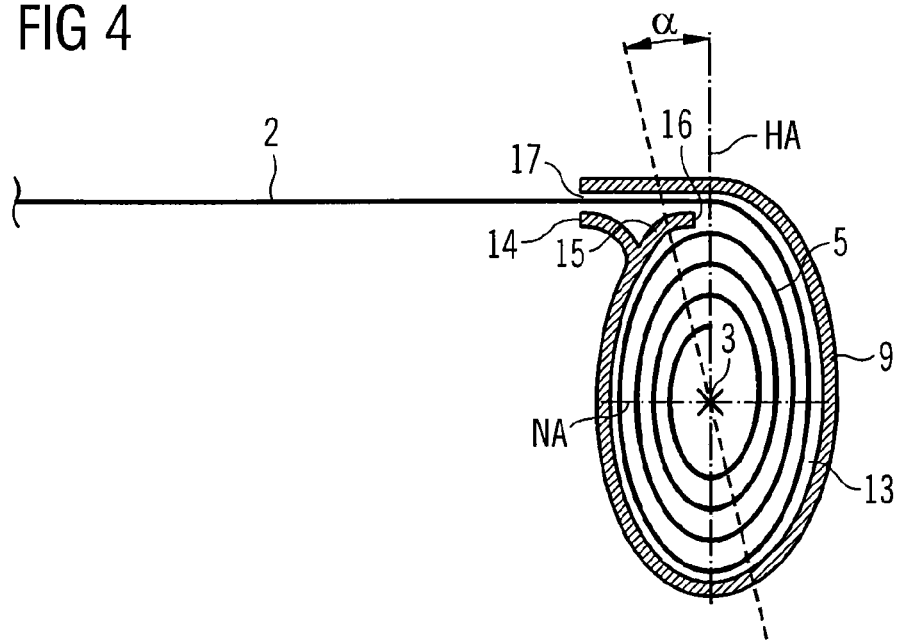
FIG. 4 shows a third alternative of the cross-sectional spatial shape according to FIG. 2.

In a further embodiment according to FIG. 4, the cross-sectional spatial shape of the winding shaping device 9 is likewise substantially oval, with the major axis HA being approximately perpendicular to the web plane of the roller blind web 2. Accordingly, the minor axis NA is arranged substantially parallel to the roller blind web plane. Although this entails a taller structural shape in a direction perpendicular to the roller blind web plane, it is for example possible for an overall structural length of the roller blind device 1 to be minimized.

Furthermore, it is shown in FIG. 4 that the major axis HA of the oval of the winding space 13 may also be arranged at an angle α with respect to the normal to the roller blind web plane. In this way, optimum matching to external geometric features is made possible in a simple manner. The angle α may lie in the range between 0° and 90°, with it also being possible for the angle α to vary along the transverse direction 10, such that it is possible to realize a helical "twisting" of the winding space in the transverse direction 10.

Figure 3:
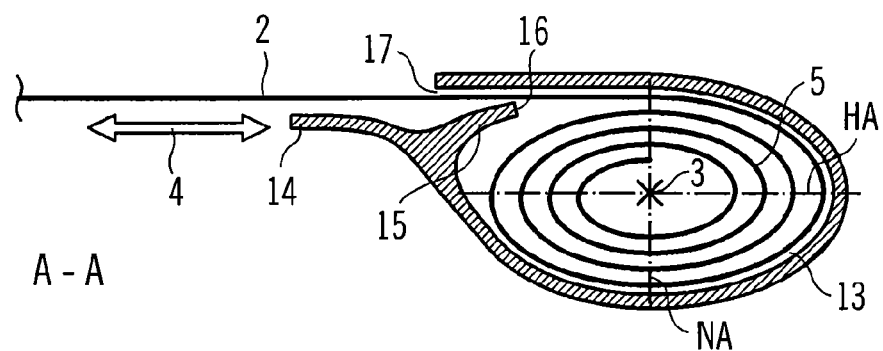
FIG. 3 shows a second alternative illustration of the cross-sectional spatial shape according to FIG. 2.

In the embodiments according to FIGS. 2 to 4, the roller blind winding 5 is arranged relative to the roller blind web 2 or roller blind web plane such that the roller blind web plane extends away from the roller blind winding 5 approximately tangentially. This means that the roller blind winding 5 or the winding axis 3 of the roller blind winding 5 is at any rate arranged offset with respect to the roller blind web plane. If this is not desired, then it is possible by means of the cross-sectional shaping according to FIG. 5 for the winding axis 3 to be arranged approximately at the level of the roller blind web plane. In this way, the roller blind web 2 is firstly deflected out of the plane of the roller blind web 2 before being wound on the roller blind winding 5. The roller blind web 2 then passes into a winding space 13 which is approximately droplet-shaped in cross section.

Figure 5:
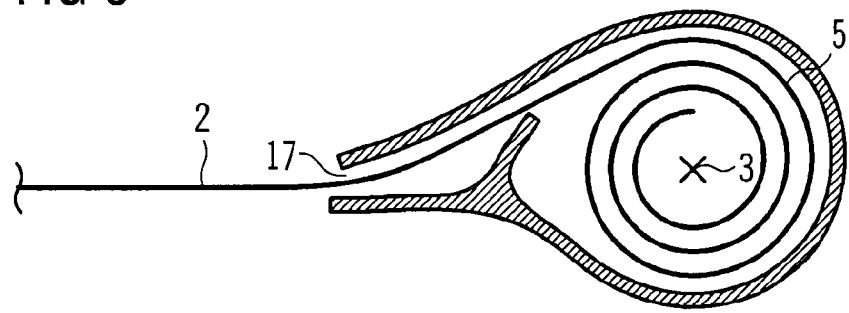
FIG. 5 shows a fourth alternative of the cross-sectional spatial shape according to FIG. 2, and FIG. 6 schematically shows a perspective illustration of a winding shaping device for a roller blind device according to the invention integrated into a roof frame of a sliding roof.

All the embodiments according to FIGS. 3 to 5 have in common the fact that the winding shaping device 9 is formed for example with a cover 9a which virtually completely surrounds the roller blind winding 5 and leaves free a slot opening 17 from which the roller blind web 2 can emerge. Such a cover 9a is optional. It is also possible for the roller blind winding 5 to be shaped and guided by means of a channel-shaped design of the winding shaping device 9 without a cover 9a, since the roller blind winding 5 can be flattened in one region for example by means of the influence of gravity alone.

It is particularly advantageous for the cross section of the winding space 3 which is bordered or defined by the winding shaping device 9 to be of variable design along the transverse direction 10. It is for example possible for a flattened spatial shape according to FIG. 3 or a shortened spatial shape according to FIG. 4 to be provided approximately in the center between the spiral springs 7 in the transverse direction 10, and for the roller blind winding 5 to be shaped in an increasingly circular manner toward the spiral springs 7. This results in continuous and slow, smooth matching of the roller blind winding cross section to the winding cross section of the spiral springs 7 which are arranged at the edge. In this way, an undesired formation of folds is prevented in particular.

FIG. 6 shows a possible arrangement of the winding shaping device 9 as an integrally formed or integral constituent part of a roof frame 19 of a sliding roof arrangement for a motor vehicle. The free end regions 11 and 12 are arranged here such that free spaces 20 are formed in which the spiral springs 7 can wind and unwind freely without interacting with the winding shaping device 9. This in particular minimizes the number of components for forming a sunshield roller blind for sliding roof arrangements.

FIGS. 1 to 6 illustrate a winding shaping device 9, 9a which is substantially formed in one piece in the transverse direction 10. It is nevertheless also possible for a multiplicity of individual winding shaping devices 9, which are for example of approximately clamp-like or clasp-like design, to be provided instead of a single, continuous winding shaping device 9, 9a. It is by all means also possible for gaps or spacings to be provided between the individual clasp-like winding shaping devices 9, in which gaps or spacings the roller blind winding 5 runs freely without being guided or shaped. Such an embodiment is described and illustrated for example in the applicant's German patent application 10 2007 021 049. The content of said patent application, the priority of which is hereby claimed, is expressly included in the present patent application.

The roller blind device according to the invention may in particular also have rotatably mounted winding elements which interact with the constant-force spring or with the spiral spring 7. Winding elements of said type are designed, for example in the German patent application 10 2007 021 049, as bolts. The entire content of the German patent application DE 10 2007 041 296.9 is also included in this patent application. The present roller blind device according to the invention may of course also be easily combined with attachments, which have guide tracks, on guide rails according to said German patent application.

Reference Symbols:
1 Roller blind device
2 Roller blind web
3 Winding axis
4 Winding direction
5 Roller blind winding
6 Longitudinal edges
7 Spiral springs
8 Spiral
9 Winding shaping device
9a Cover
10 Transverse direction
11 First free end region
12 Second free end region
13 Winding space
14 Free edge
15 Stop rib
16 Free edge
17 Slot opening
19 Roof frame
20 Free spaces
HA Major axis
NA Minor axis
a Minimum spacing
α Angle

The invention claimed is:

1. A roller blind device, having a roller blind web that, at least one end, is wound by a winding device to form a roller blind winding, with the winding device comprising self-winding first and second spiral springs that are connected to the roller blind along first and second longitudinal edges, respectively, extending in a winding direction of the roller blind web, wherein a winding shaping device is provided for shaping and guiding the roller blind winding, with the winding shaping device extending transversely to a winding direction of the roller blind web between first and second free end regions of the winding shaping device defining a length thereof shorter than a width of the roller blind such that the first and second longitudinal edges are spaced laterally outside of the first and second free end regions of the winding device, respectively such that the winding shaping device interacts with the roller blind web only in web regions of the roller blind web between the first and second spiral springs.

2. The roller blind device as claimed in claim 1, wherein the roller blind device is formed without a winding core.

3. The roller blind device as claimed in claim 1, wherein the winding shaping device is integrally formed on or integrated in a roof frame.

4. The roller blind device as claimed in claim 1, wherein the first and second free end regions of the winding shaping device have a minimum spacing of at least 5 millimeters from the spiral springs in a roller blind web transverse direction.

5. The roller blind device as claimed in claim 1, wherein the winding shaping device substantially completely surrounds the roller blind winding and has a slot opening for the roller blind web.

6. The roller blind device as claimed in claim 1, wherein the winding shaping device is of substantially shell-like or channel-like design.

7. The roller blind device as claimed in claim 1, wherein the winding shaping device is contoured, along the longitudinal extent of the roller blind winding.

8. The roller blind device as claimed in claim 7, wherein the winding shaping device is curved along the longitudinal extent of the roller blind winding.

9. The roller blind device as claimed in claim 1, wherein the winding shaping device has a winding space for holding the roller blind winding.

10. The roller blind device as claimed in claim 9, wherein the winding space has a substantially circular shape in cross section.

11. The roller blind device as claimed in claim 9, wherein a cross section of the winding space approaches a circular spatial shape in the direction of the first and second spiral springs.

12. The roller blind device as claimed in claim 9, wherein the winding space has a flattened, oval shape in cross section.

13. The roller blind device as claimed in claim 12, wherein a major axis of the oval, flattened cross section runs substantially parallel to or in a web plane of the roller blind web.

14. The roller blind device as claimed in claim 12, wherein the major axis runs substantially normally with respect to a web plane of the roller blind web.

15. The roller blind device as claimed in claim 12, wherein the major axis runs so as to be inclined at an angle ($\alpha$) with respect to a web plane of the roller blind web.

* * * * *